No. 5,906. PATENTED NOV. 7, 1848.
C. BALDWIN.
MACHINERY FOR CUTTING CRACKERS, &c.

2 SHEETS—SHEET 1.

No. 5,906. PATENTED NOV. 7, 1848.
C. BALDWIN.
MACHINERY FOR CUTTING CRACKERS, &c.
2 SHEETS—SHEET 2.
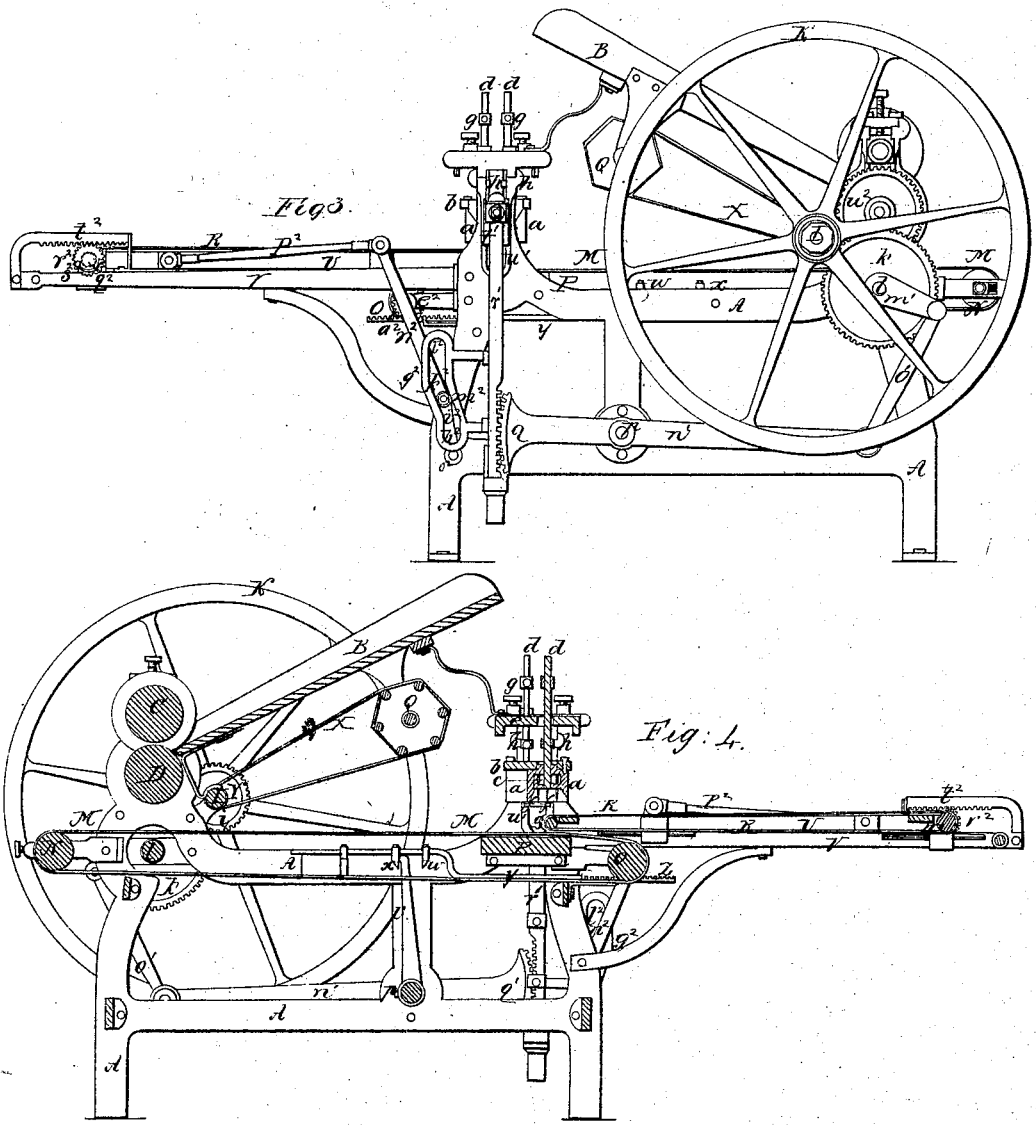

UNITED STATES PATENT OFFICE.

CYRUS BALDWIN, OF GOFFSTOWN, NEW HAMPSHIRE, ASSIGNOR TO J. & E. BALDWIN.

CUTTING AND STAMPING OUT CRACKERS, SHIP-BISCUIT, &c.

Specification of Letters Patent No. 5,906, dated November 7, 1848.

*To all whom it may concern:*

Be it known that I, CYRUS BALDWIN, of Goffstown, in the county of Hillsborough and State of New Hampshire, have invented a certain new and useful improvement in machinery for cutting or stamping out crackers, ship-biscuit, &c., from dough, which improved mechanism is also applicable for cutting or stamping or forming various other articles from various other substances; and I do hereby declare that the same is fully described and represented in the following specification and accompanying drawings, letters, figures, and references thereof.

Figure 1:
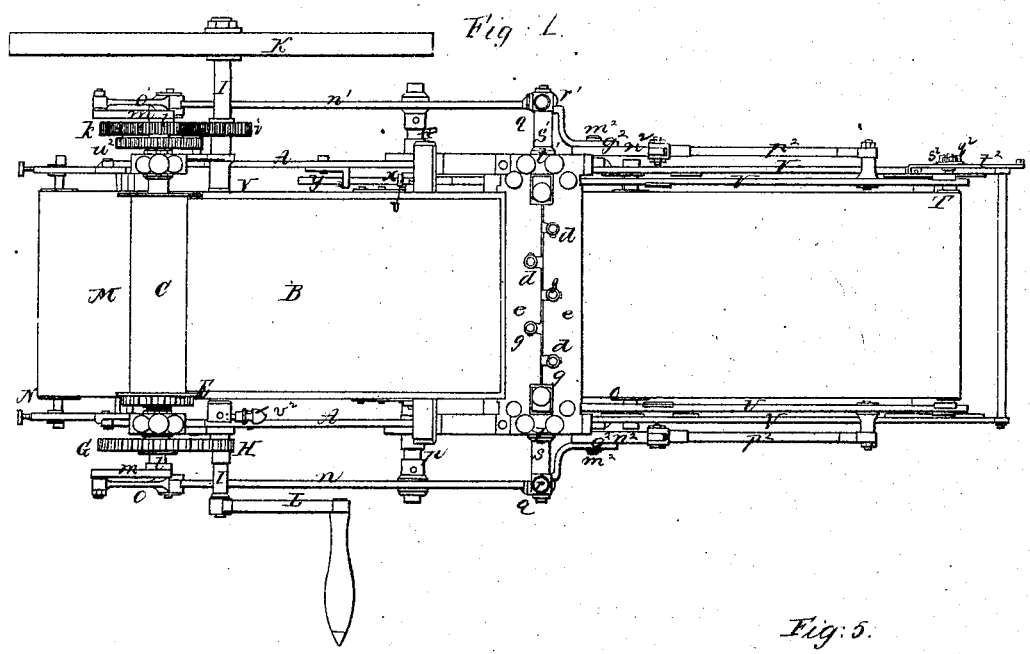
Figures 2, 5:
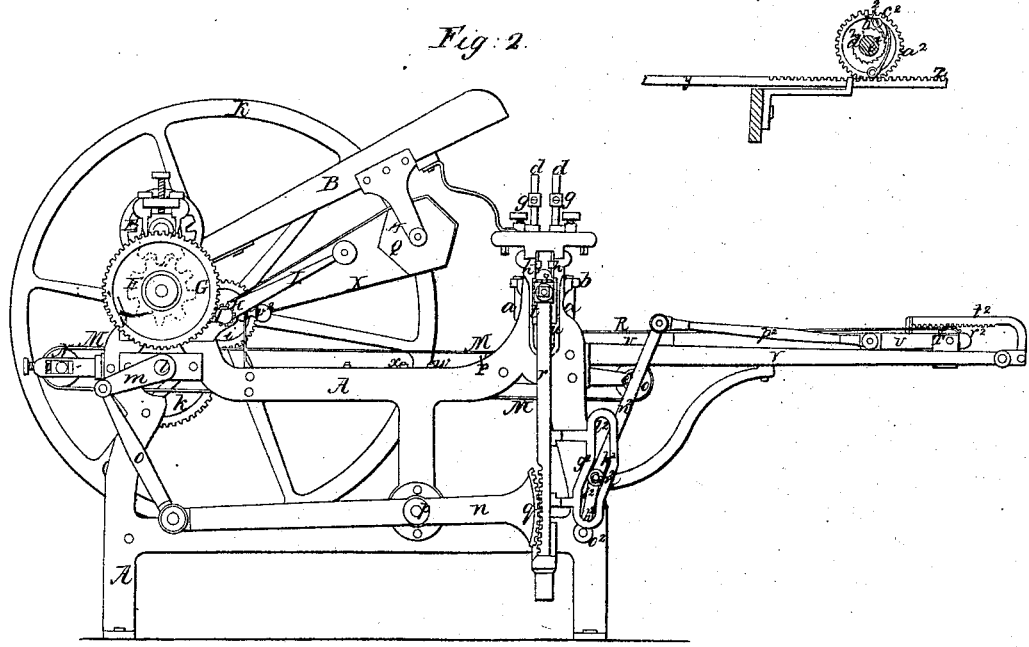

Of the said drawings, Figure 1, denotes a top view or plan of my improved cracker machine. Fig. 2, is an elevation of one side of the same, that is to say that side on which is situated the crank to which the power by which the machine is driven, is applied. Fig. 3, is an elevation of the opposite side. Fig. 4, is a vertical central and longitudinal section of the machine.

A, in the said drawings exhibits the frame work by which the operative parts of the machine are sustained in their respective situations.

B, is an inclined plane or trough, on which the dough to be converted into crackers is laid, and by which it is conveyed to two drawing and reducing rollers C, D, arranged with respect to the said trough as seen in the drawings. The upper one of the said rollers has its journals supported by such contrivances as will admit of the distance of the roller from that beneath it being adjusted at pleasure. The two rollers are suitably geared together so as to move in concert, the gears being represented at E, and at F, by dotted lines. On one end of the shaft of the lower roller is a gear wheel G, which is made to engage with and be turned by a pinion H, on the driving shaft I, the said shaft having a fly wheel K, on one end of it, and a crank L, or other suitable contrivance for putting it in motion on the other end of it.

The dough after passing between the reducing cylinders or rollers, is received upon a long endless apron M, which is placed underneath the said rollers, and sustained in position by two rollers N, O, around which it is made to pass. In its passage from one of the said rollers to the other it moves over and in contact with the upper surface of a flat cushion or elastic bed, board or table P. Between the said endless apron and the inclined trough B, I arrange what I term the duster Q. The said duster consists of a long hollow cylindrical, prismatic or other proper shaped vessel, whose sides are made of some perforated or porous material which when the said vessel is revolved, and contains flour, will allow the flour to sift through them, and fall upon the apron or dough thereon as it passes toward the series of cutters to be hereinafter described. An endless belt X, passing around the pulley Y, (on the driving shaft) and one of the heads of the duster, serves to revolve the duster and thereby cause the flour to be gradually sifted out of it.

In connection with the aforementioned endless apron, another endless apron R, is used the latter apron being made to pass around, and be supported by two rollers S, T, which extend from side to side of a horizontal and movable carriage or frame V, which is suitably sustained by the two parallel rails V, V, or projections therefrom and so as to be capable of being moved back and forth, or of receiving a reciprocating rectilinear motion as occasion may require.

While the cutters are in action upon the dough, the endless apron R, is moved entirely away from underneath the same, and so as to permit the cutters to descend upon the dough and bed P, and pass through the former. As soon as the cutters commence their ascent above or away from the dough, the said endless apron R, is moved bodily so as to be carried directly underneath the cutters a sufficient distance to receive the crackers on their expulsion from the cutters. After proceeding to explain the construction and operation of the series of cutters, I shall describe the mechanism by which the movements of the endless aprons M and R are produced.

The cutters consist of a series of hollow cylinders or prisms a, a, &c., affixed to the underside of a horizontal frame or plate b, which is made by mechanism to rise and fall and carry the cutters down upon, and away from the table or elastic bed or surface P. Each of the said cutters (there may be any convenient number of them) has a piston $c$, disposed within it, and applied to the lower end of a rod $d$, which passes up and moves freely through the plate $b$, and a stationary or fixed horizontal plate or bar $e$, situated above the plate $b$, as seen in the drawings. The several pistons or plates $c$, should be packed or made to move air tight or very nearly air tight in their cylinders, the lower parts of the said cylinders being made sharp or with cutting edges, so as to cut into and through the sheet of dough on the apron M. Pointed wires $f, f$, &c., extend downward through each cylinder and piston they being fixed into the plate $b$.

On each piston rod $d$, two shoulders or collars $g, h$, are placed as seen in the drawings, the upper set of collars being so arranged on their respective rods that at the moment the cutters commence to enter the dough, they the shoulders $g, g$, &c., shall be down upon or in contact with the plate $e$.

This being the case the pistons will be stationary while the cutters descend through the dough. In consequence of such a movement of the cutters on their pistons the crackers or parts of dough within the cylinders will be held in place by atmospheric pressure, while the cutters are made to rise upward, and until the lower set of collars $h, h$, &c., are carried (by the elevation of the plate $b$,) up against the underside of the plate $e$. When this takes place the pistons are again held stationary while the cutters are made to ascend far enough to cause the pistons to expel the crackers, and allow them to drop upon the endless apron R, which during the meantime has been moved under the cutters a sufficient distance to receive the crackers when they fall out of the cutters. The lower series or set of collars $h, h$, &c., should be properly adjusted on their rods so as to produce the expulsion of the crackers in the manner as above specified. The pistons should be made to fit quite tight in their cylinders, in fact so tight as not to move therein except when moved by the operation of the collars against the plates $b$, and $e$, as above described. The machineery by which the plate $b$, and the cutters attached to it are elevated and depressed, is as follows:

On or near one end of the driving shaft is a gear wheel $i$, which engages with a cogged wheel $k$, fixed on a horizontal shaft $l$, disposed as seen in the drawings. Said shaft is made to revolve in suitable bearings, and has two cranks $m, m'$, fixed on its ends. Each of these cranks is connected with a sectoral toothed lever $n$ or $n'$ by a connecting rod $o$ or $o'$, as seen in the drawings, the said rod being jointed both to the crank and lever to which it belongs. The two levers $n, n'$, are affixed respectively to the two ends of a horizontal rocker shaft $p$, which is made to rest and move in suitable bearings, applied to the framework. An arc $q$, of teeth is affixed on the end of each lever as seen in Figs. 2 and 3, the said arc of teeth being made to engage with one of two vertical rack bars $r, r'$, which are jointed at their upper ends to ears $s, s'$, which project from the plate $b$, or from the supports $t, t'$, thereof, the said supports being made to sustain the plate and to move in vertical guide slots or passages $u, u'$, arranged as seen in Figs. 2, 3, and 4. By means of the machinery just described, the cutter frame and cutters are made to all rise and fall alternately, when the driving shaft is put in revolution.

The next part of the mechanism to be explained is that by which the endless apron M, is caused to alternately move or revolve forward a short distance on its rollers, and remain stationary; the said forward movement of the apron being for the purpose of carrying the sheet of dough on it under the cutters, while the interval of rest is for the purpose of allowing the cutters time to descend upon and through, and rise out of the dough, in a manner proper to separate the crackers, or biscuits therefrom. An arm $v$, is fixed upon the rocker shaft $p$, and extends upward therefrom as seen in Fig. 4. Its upper end extends between two shoulders or studs $w, x$, extending from a horizontal slide rod $y$, which is supported in suitable bearings which admit of its being slid or moved freely to and fro with a reciprocating rectilinear movement. The forward end of this rod has a rack of teeth $z$, made upon it, the said rack being made to engage with a toothed gear wheel $a^2$, which is made to run loosely upon the shaft of the roller O. To one side of the said wheel is affixed a spring pawl such as is seen at $b^2$, in Fig. 5, which is a view of the rack Z and inner face of wheel $a^2$, and pawl. The said pawl turns upon a screw pin $c^2$, and works into a ratchet wheel $d^2$ fixed on and to the shaft $e^2$, of the roller O. When the rack bar or rod $y$, is drawn inward or toward the driving shaft, the pawl $b^2$, so acts against the teeth of the ratchet wheel as to lock it to the wheel $a^2$, and thereby cause the said ratchet wheel and the roller O, to revolve. When the rack bar is moved in the opposite direction the pawl will slip over the teeth of the ratchet wheel and produce no rotary motion of the roller O. It is therefore by means of the vibratory movement of the rocker shaft and arm attached to it, and the rack bar, gear wheel, spring pawl, and ratchet wheel as above described, that the endless apron M, is caused to alternately move forward a short distance, and during a short time, and remain stationary a like period of time.

The succeeding and last portion of the mechanism to be described, is that by which the endless apron R, is operated. When the cutters are raised out of the dough, the said apron, and the frame or carriage which supports it, are to be moved toward and under the cutters so as to receive the crackers upon the apron when they drop out of the cutters or after they are expelled therefrom. While the said apron is being so moved bodily it is to have another movement imparted to it, that is to say it is caused to partially revolve a short distance on its supporting rollers, in order that the crackers which were previously dropped on it may be moved forward or out of the way of those which it is then to receive. After this is effected and the apron has received the said crackers, it next becomes necessary to remove it out from underneath the cutters far enough to permit them to descend upon the sheet of dough which has been advanced upon the apron M, and is ready to be operated on by the cutters. The scraps or waste portions of the dough, or those which remain upon the apron M, pass between the two aprons and over the front end of the apron M, and drop upon the floor or into a proper receptacle suitably placed to receive them.

Attached to each of the vertical rack bars $r$, $r'$, is a grooved or slotted plate $g^2$, having a slot $h^2$ $i^2$ $k^2$ $l^2$, made through it as seen in the drawings. The parts $h^2$ $i^2$ $l^2$ $k^2$, of the said slot are vertical and parallel to each other, and are connected by an inclined part or passage $i^2$, $k^2$. Each of the said slots receives a roller $m^2$, which is applied to the side of a lever or rod $n^2$, which is secured at its lower end to the adjacent side of the frame by a screw pin or fulcrum $o^2$, and in such manner as to allow the said lever to be moved either in one direction or the other in a plane parallel to the side of the frame. Each of the levers or rods $n^2$ is connected to the carriage V, by a connecting rod $p^2$, jointed both to the carriage and lever, and in such manner as that when the rollers $m^2$, $n^2$ are in the inclined parts $i^2$ $k^2$, of the slots of the plates $g^2$, $g^2$, and the said plates are moved either upward or downward, the carriage V, may either have a forward or a backward movement, that is one either toward or away from the series of cutters. As the slotted plates $g^2$, are moved vertically with and by the movements of the rods to which they are fastened, the rollers $m^2$, $m^2$, when moving in either of the portions $h^2$, $i^2$, or $k^2$, $l^2$, of their slots will play freely up and down in such portions without any movement of the carriage V, being produced. In other words while the said rollers are in the said portions of the slots, the carriage is at rest.

The rotation or movements of the endless apron R, upon its sustaining rollers at the proper times is effected by machinery, as follows:

The external roller T, of the said apron, has fixed upon one end of its shaft or journal a ratchet wheel $q^2$, in connection with which a spur gear $r^2$, and a spring pawl $s^2$, operates, the said spur gear being made to turn loosely upon the journal of the roller, and the whole being arranged, and made as represented in the drawings. The teeth of the said spur gear engage with those of a fixed horizontal rack $t^2$, disposed as seen in Figs. 3 and 4. From the above it will be seen that when the carriage V, is moved toward the cutters, the rack $t^2$, will rotate the spur geer $r^2$, which by means of the ratchet and pawl becomes locked to the shaft of the roller T, and in consequence thereof revolves the said roller and thereby creates a consequent movement of the endless apron, on its supporting rollers. When the carriage U, is moved in an opposite direction, the spring pawl will slip over the teeth of the ratchet wheel, and produce no movement of the endless apron on or about its rollers.

As it may sometimes be desirable to throw the mechanism which produces the movements of the cutters and endless aprons out of gear with that which operates the reducing or draw rollers C, D, in order to use these latter, for the purpose of reducing dough to a uniform thickness for other purposes, I place upon the shaft of the lower reducing roller a cogged wheel $u^2$, and I make the driving shaft so as to slide lengthways in its boxes or bearings, so as to carry the gear wheel $i$, into action with the said wheel $u^2$, and out of action with the wheel $k$, before mentioned. A small spring latch $v^2$, is affixed to the main frame, as seen in Fig. 2, its point being made to pass through one of the boxes of the driving shaft, and enter a groove cut in and around the journal of the shaft. This serves to keep the shaft in place, when the wheels $i$, and $u^2$, are in gear with each other.

Having thus described my improved machine for cutting crackers, or biscuit from dough, that which I claim therein is as follows:

1. I claim the combination of an air-tight cylinder and piston with each of the cutters, so as to operate in the manner as above specified, and by means of suction or the pressure of the atmosphere raise the cracker or biscuit out of the dough or scraps and prevent it from dropping out of the cutter while the latter is being elevated all as above set forth, meaning to claim in connection with each cutter an apparatus to create atmospheric pressure on the biscuit or cracker, substantially as described and for the aforesaid purpose.

2. I also claim the combination of the series of cutters or cutting mechanism, and the two endless aprons M and R, as made to operate together substantially in the manner as above specified.

3. I also claim the revoluble flour duster as combined with the endless apron M, and used substantially in manner and for the purpose of sifting flour on the dough as specified.

In testimony whereof I have hereto set my signature this eighteenth day of February, A. D. 1848.

CYRUS BALDWIN.

Witnesses:
 GEO. Y. SAWYER,
 AARON F. STEVENS.